(12) United States Patent
Kelly et al.

(10) Patent No.: US 11,573,811 B2
(45) Date of Patent: Feb. 7, 2023

(54) VIRTUAL DESKTOP CONFIGURATION SYSTEM

(71) Applicant: Dell Products L.P., Round Rock, TX (US)

(72) Inventors: John Kelly, Mallow (IE); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/327,218

(22) Filed: May 21, 2021

(65) Prior Publication Data

US 2022/0374252 A1    Nov. 24, 2022

(51) Int. Cl.
*G06F 9/451*    (2018.01)
*G06F 3/0481*   (2022.01)
*G06F 9/445*    (2018.01)

(52) U.S. Cl.
CPC ............ *G06F 9/452* (2018.02); *G06F 3/0481* (2013.01); *G06F 9/44505* (2013.01)

(58) Field of Classification Search
CPC ..... G06F 9/452; G06F 3/0481; G06F 9/44505
See application file for complete search history.

(56) References Cited

U.S. PATENT DOCUMENTS

| | | | |
|---|---|---|---|
| 8,200,796 B1* | 6/2012 | Margulis | H04N 21/4437 709/223 |
| 8,719,522 B1* | 5/2014 | Chait | G06F 11/1469 711/162 |
| 10,318,320 B1* | 6/2019 | Thomas | G06F 9/452 |
| 2011/0051000 A1* | 3/2011 | Hara | G06F 11/1004 348/553 |
| 2016/0147427 A1* | 5/2016 | Liverance | H04L 67/14 715/743 |
| 2016/0246560 A1* | 8/2016 | Petrov | G06F 9/452 |

OTHER PUBLICATIONS

Kelly, John, "Desktop Display Assignment Optimization in a Virtual Desktop Environment," U.S. Appl. No. 17/148,241, filed Jan. 13, 2021, 34 pages.

* cited by examiner

*Primary Examiner* — Michael Roswell
(74) *Attorney, Agent, or Firm* — Joseph Mencher (57) ABSTRACT

A networked system includes a plurality of endpoint devices that each include a compute device and a display device. A virtual desktop configuration system is coupled to the plurality of the plurality of endpoint devices via a network and is configured to retrieve display device characteristics associated with the display device in at least one of the plurality of endpoint devices, configure virtual desktop display characteristics for a virtual desktop based on the display device characteristics, and transmit virtual desktop images having the virtual desktop display characteristics to the compute device in the at least one of the plurality of endpoint devices to cause that compute device in that endpoint device to display the virtual desktop images on the display device in that endpoint device.

18 Claims, 8 Drawing Sheets

VIRTUAL DESKTOP CONFIGURATION SYSTEM

BACKGROUND

The present disclosure relates generally to information handling systems, and more particularly to configuring virtual desktops for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computing devices, laptop/notebook computing devices, table computing devices, mobile phones, and/or other computing devices known in the art, include display devices that are utilized to display images, and it may be desirable to display configure those images according to display device capabilities, user preferences, and/or organizational requirements. Conventionally, protocols such as the Display Data Channel (DDC) protocol are utilized between the computing device and its display device to detect the display device capabilities, as well as store user preferences and organizational requirements in order to allow the computing device to configure images and display them on the display device in a manner that is optimized for the display device while also satisfying user preferences and organizational requirements. However, as many businesses move to a remote-work paradigm, the use of Virtual Desktop Infrastructure (VDI) to provide virtual desktops and display associated virtual desktop images is increasing proportionally due to the benefits it provides in relation to security, operational simplicity, and/or other benefits known in the art, and conventional VDI systems do not consider the display device capabilities when configuring the virtual desktop images for the computing device to display on their display devices, often resulting in a non-optimized experience with the display device, for the user, and/or with regard to the organization. Furthermore, users may regularly utilize different computing devices to access their virtual desktops, and thus user preferences and/or organizational requirements must continually be set for the corresponding display devices if the virtual desktop is to be displayed according to the preferences of a particular user or organization.

Accordingly, it would be desirable to provide virtual desktop configuration system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a virtual desktop configuration engine that is configured to: retrieve display device characteristics associated with a display device in at least one of a plurality of endpoint devices; configure, based on the display device characteristics, virtual desktop display characteristics for a virtual desktop; and transmit virtual desktop images having the virtual desktop display characteristics to a compute device in the at least one of the plurality of endpoint devices to cause that compute device in that endpoint device to display the virtual desktop images on the display device in that endpoint device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
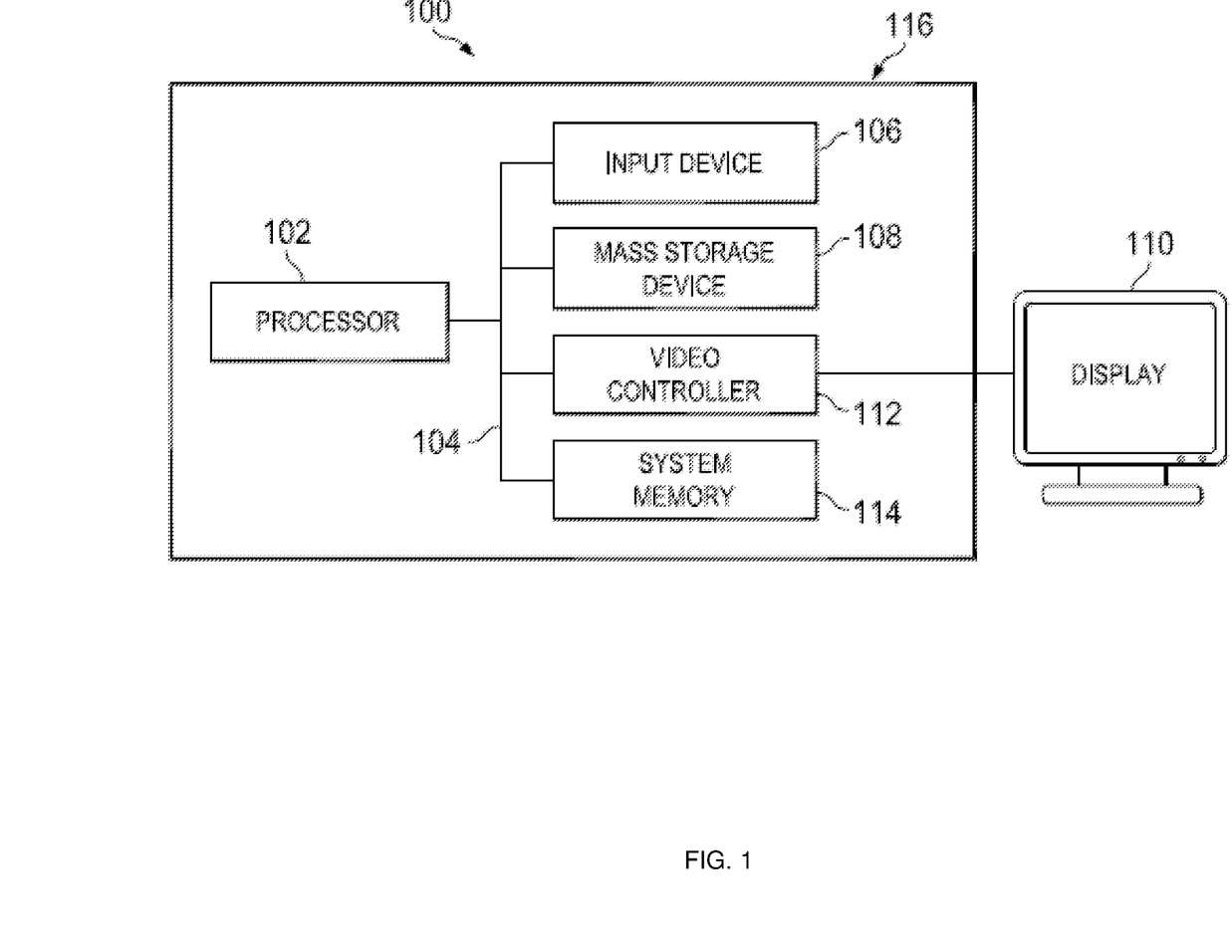
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
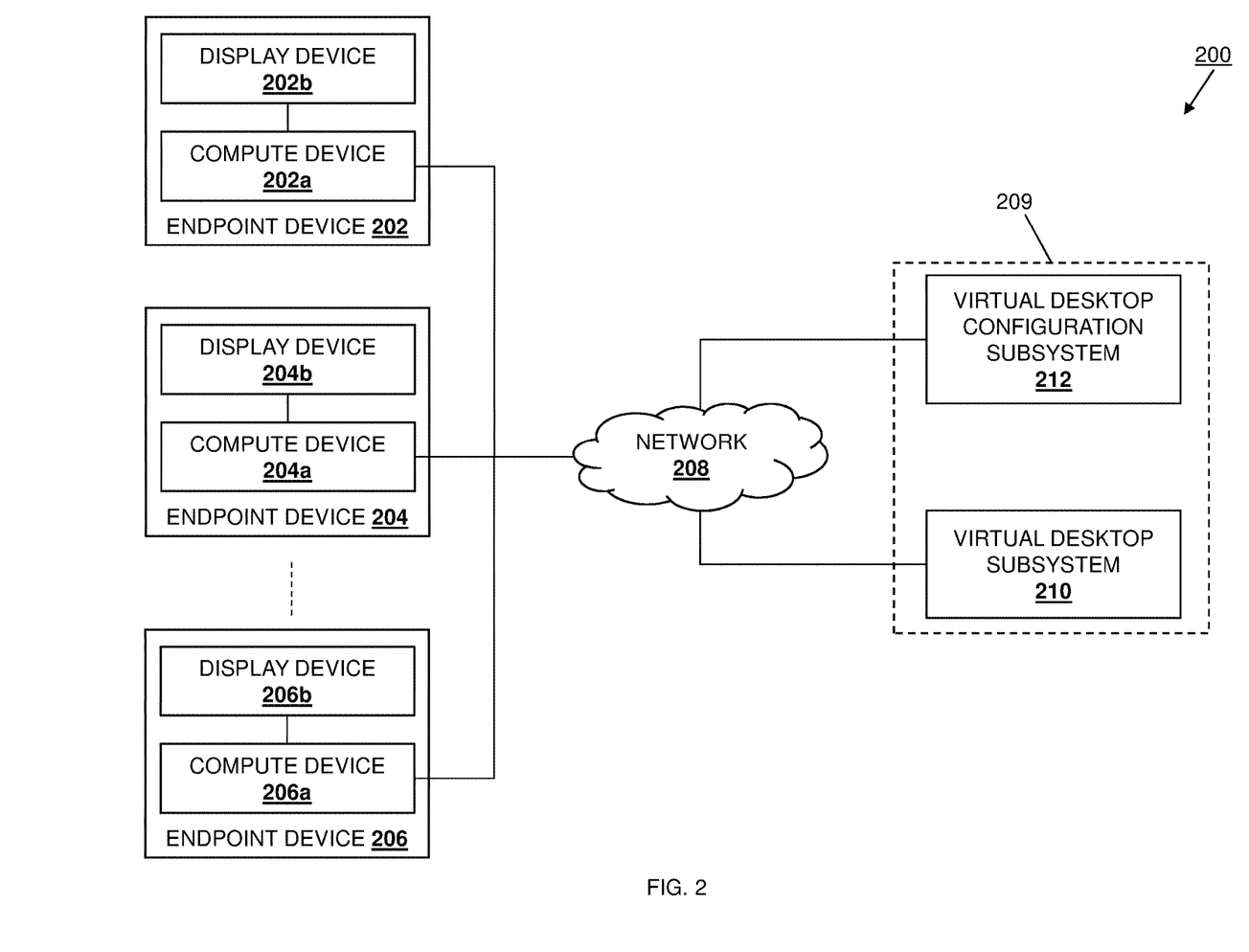
FIG. 2 is a schematic view illustrating an embodiment of a networked system that may include the virtual desktop configuration system of the present disclosure.

Referring now to FIG. 2, an embodiment of a networked system 200 is illustrated. In the examples illustrated and discussed below, the networked system 200 includes a plurality of endpoint devices 202, 204, and up to 206. In an embodiment, any or all of the endpoint devices 202-206 may be provided by the IHS 100 discussed above with reference to FIG. 1, may include some or all of the components of the IHS 100, and in specific examples, may include desktop computing devices, laptop/notebook computing devices, tablet computing devices, mobile phones, and/or other computing devices that would be apparent to one of skill in the art in possession of the present disclosure. For example, each of the plurality of endpoint devices 202-206 may include a compute device coupled to a display device, with the endpoint device 202 illustrated as including a compute device 202a coupled to a display device 202b, the endpoint device 204 illustrated as including a compute device 204a coupled to a display device 204b, and the endpoint device 206 illustrated as including a compute device 206a coupled to a display device 206b. However, while illustrated and discussed as being provided by particular computing devices, one of skill in the art in possession of the present disclosure will recognize that endpoint devices provided in the networked system 200 may include any devices that may be configured to operate similarly as the endpoint devices 202-206 discussed below In the illustrated embodiment, the compute device 202a, 204a, and up to 206a in each of the endpoint devices 202, 204, and up to 206, respectively, is coupled to a network 208 that may be provided a Local Area Network (LAN), the Internet, combinations thereof, and/or any of a variety of other networks that would be apparent to one of skill in the art in possession of the present disclosure. The networked system 200 also includes a virtual desktop configuration system 209 that is coupled to the network 208 and that, in the examples illustrated and discussed herein, includes a virtual desktop subsystem 210 and a virtual desktop configuration subsystem 212 that are described below as separate subsystems to illustrate how the virtual desktop configuration functionality (performed by the virtual desktop configuration subsystem 212 below) of the present disclosure differs from conventional virtual desktop functionality (performed by the virtual desktop subsystem 210 below) However, while discussed as separate subsystems, one of skill in the art in possession of the present disclosure will appreciate how the functionality of the virtual desktop subsystem 210 and the virtual desktop configuration subsystem 212 may be integrated into a single virtual desktop configuration system 209 while remaining within the scope of the present disclosure as well.

In an embodiment, either or both of the virtual desktop subsystem 210 and the virtual desktop configuration subsystem 212 may be provided by the IHS 100 discussed above with reference to FIG. 1, may include some or all of the components of the IHS 100, and in specific examples, may include one or more server devices, with the server device(s) providing the virtual desktop subsystem 210 configured to provide a Virtual Desktop Infrastructure (VDI) system that is configured to perform conventional virtual desktop/VDI provisioning operations, and with the server device(s) providing the virtual desktop configuration subsystem 212 configured to perform the virtual desktop/VDI configuration operations of the present disclosure. However, while illustrated and discussed as being provided by one or more server devices, one of skill in the art in possession of the present disclosure will recognize that the virtual desktop functionality and virtual desktop configuration functionality provided in the networked system 200 may be provided using any devices that may be configured to operate similarly as the virtual desktop subsystem 210 and the virtual desktop configuration subsystem 212 discussed below. Furthermore, while a specific networked system 200 has been illustrated and described, one of skill in the art in possession of the present disclosure will recognize that the virtual desktop configuration system of the present disclosure may include a variety of components and component configurations while remaining within the scope of the present disclosure.

Figure 3:
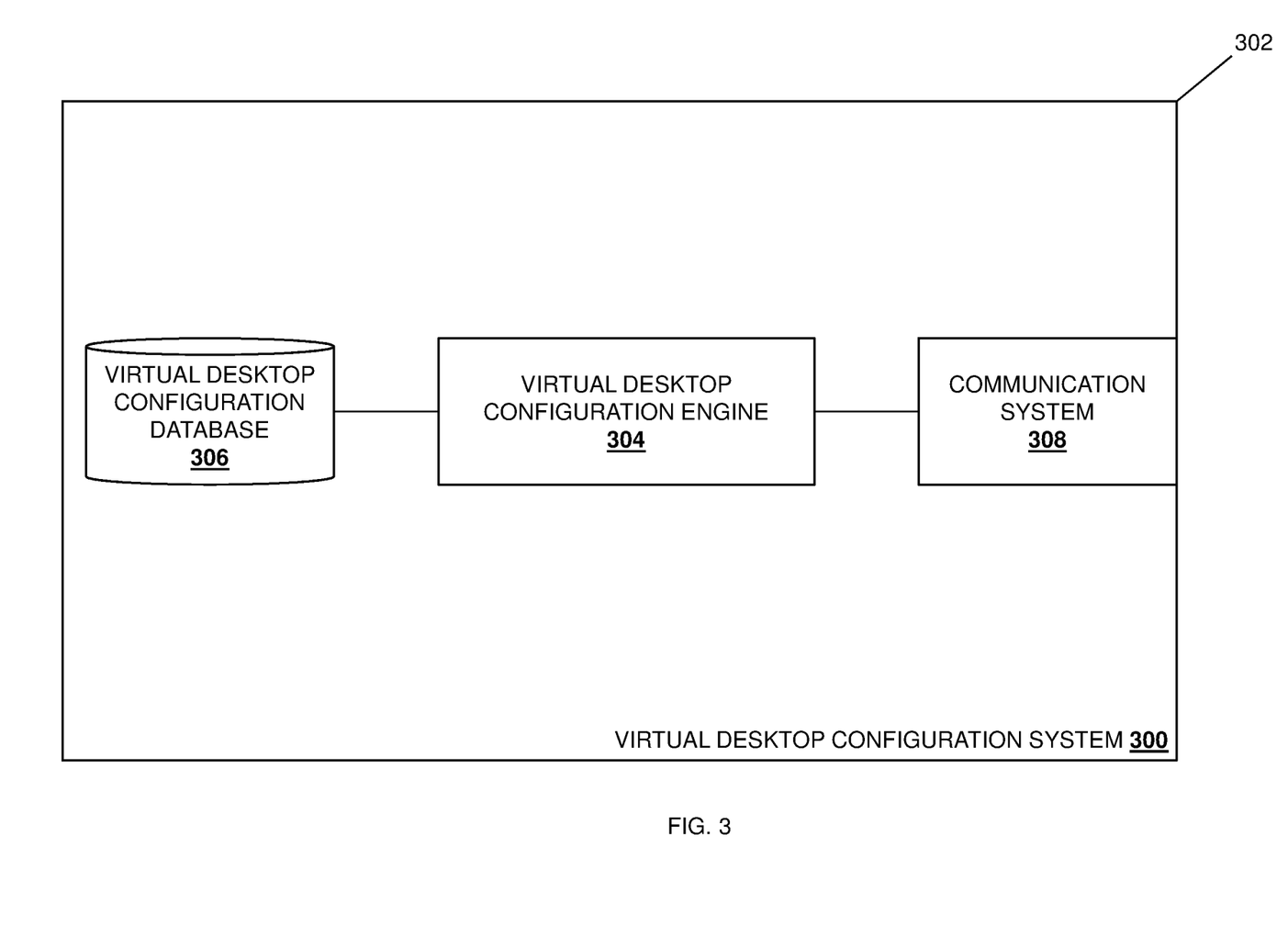
FIG. 3 is a schematic view illustrating an embodiment of a virtual desktop configuration system that may be included in the networked system of FIG. 2.

Referring now to FIG. 3, an embodiment of a virtual desktop configuration system 300 is illustrated that may provide the virtual desktop configuration system 209 and/or virtual desktop configuration subsystem 212 discussed above with reference to FIG. 2. As such, the virtual desktop configuration system 300 may be provided by the IHS 100 discussed above with reference to FIG. 1 and/or may include some or all of the components of the IHS 100, and in specific examples may be provided by one or more server devices. However, while illustrated and discussed as being provided by one or more server devices, one of skill in the art in possession of the present disclosure will recognize that the functionality of the virtual desktop configuration system 300 discussed below may be provided by other devices that are configured to operate similarly as the virtual desktop configuration system 300 discussed below. In the illustrated embodiment, the virtual desktop configuration system 300 includes a chassis 302 that houses the components of the virtual desktop configuration system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a virtual desktop configuration engine 304 that is configured to perform the functionality of the virtual desktop configuration engines and/or virtual desktop configuration systems/subsystems discussed below.

The chassis 302 may also house a storage system (not illustrated, but which may include the storage 108 discussed above with reference to FIG. 1) that is coupled to the virtual desktop configuration engine 304 (e.g., via a coupling between the storage system and the processing system) and that includes a virtual desktop configuration database 306 that is configured to store any of the information utilized by the virtual desktop configuration engine 304 discussed below. The chassis 302 may also house a communication system 308 that is coupled to the virtual desktop configuration engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. However, while a specific virtual desktop configuration system 300 has been illustrated, one of skill in the art in possession of the present disclosure will recognize that virtual desktop configuration systems (or other devices operating according to the teachings of the present disclosure in a manner similar to that described below for the virtual desktop configuration system 300) may include a variety of components and/or component configurations for providing conventional functionality, as well as the functionality discussed below, while remaining within the scope of the present disclosure as well.

Figure 4:
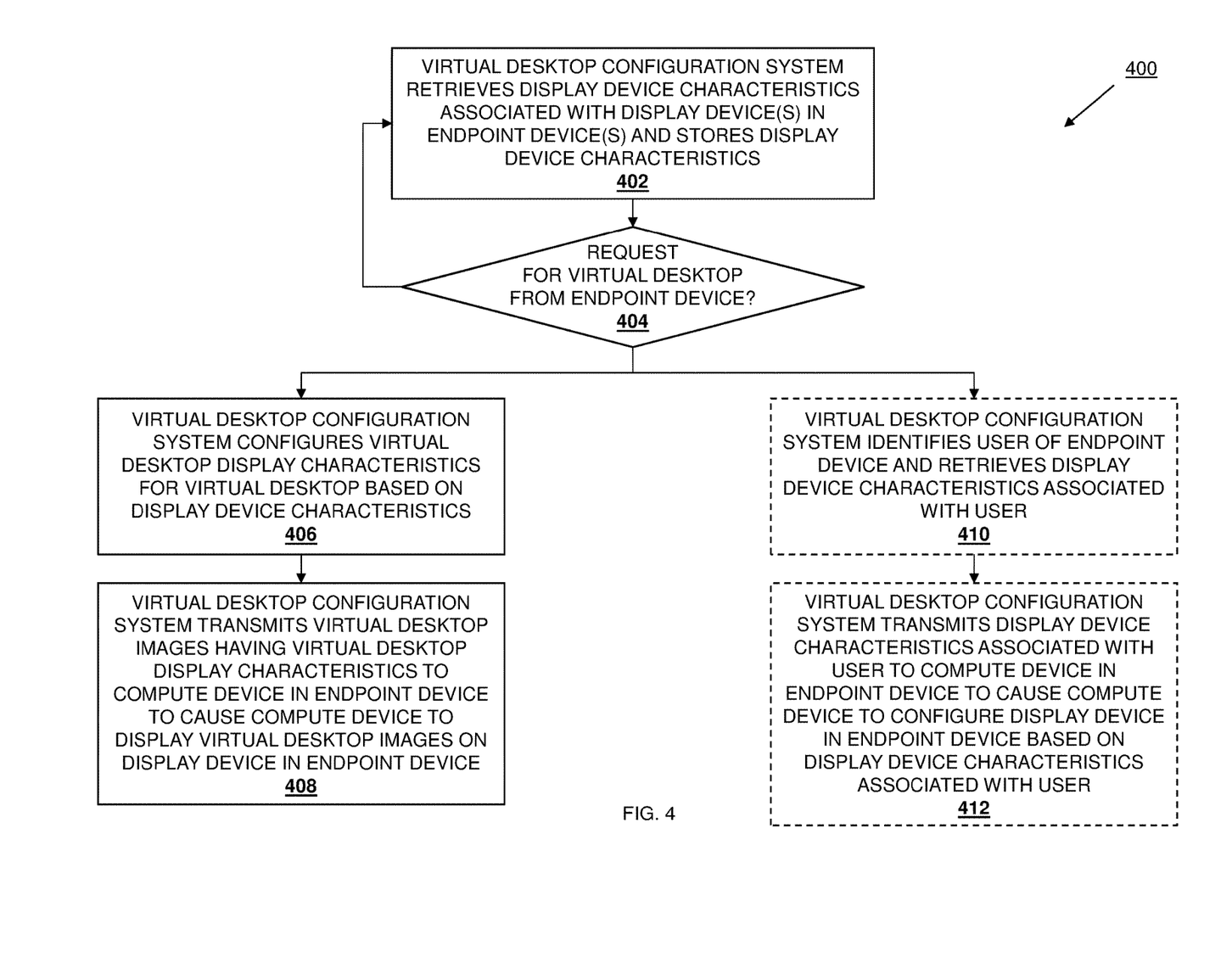
FIG. 4 is a flow chart illustrating an embodiment of a method for configuring virtual desktops.

Referring now to FIG. 4, an embodiment of a method 400 for configuring virtual desktops is illustrated. As discussed below, the systems and methods of the present disclosure provide for the configuration of virtual desktops based on the display characteristics of display devices in endpoint devices upon which virtual desktops will be provided, as well as the configuration of the display devices that will be used to display those virtual desktops based on user preferences for the users of those display devices/endpoint device, and/or organizational requirements of organizations to which the users of those display devices/endpoint devices belong, in order to optimize the virtual desktop experience provided on those endpoint devices. For example, the networked system of the present disclosure may include a plurality of endpoint devices that each include a compute device and a display device. A virtual desktop configuration system is coupled to the plurality of endpoint devices via a network and is configured to retrieve display device characteristics associated with the display device in at least one of the plurality of endpoint devices, configure virtual desktop display characteristics for a virtual desktop based on the display device characteristics, and transmit virtual desktop images having the virtual desktop display characteristics to the compute device in the at least one of the plurality of endpoint devices to cause that compute device in that endpoint device to display the virtual desktop images on the display device in that endpoint device. As such, embodiments of the present disclosure enhance VDI systems to optimize virtual desktops based on the display device being used to display them, and/or configure that display device based on the user and/or organization for which they're being provided.

The method 400 begins at block 402 where a virtual desktop configuration system retrieves display device characteristics associated with display device(s) in endpoint device(s) and stores the display device characteristics. In some embodiments, block 402 of the method 400 may be performed in response to the virtual desktop configuration subsystem 212 in the virtual desktop configuration system 209 determining that the endpoint devices 202, 204, and 206 are configured to provide display device information that includes display device characteristics associated with the display devices 202b, 204b, and 206c, respectively. For example, at or prior to block 402, the virtual desktop configuration engine 304 in the virtual desktop configuration subsystem 212/300 may perform a remote system call via its communication system 300 and through the network 208 to detect whether the compute devices 202a, 204a, and 206a in each of the endpoint devices 202, 204, and 206, respectively, include operating systems that support a display device information sharing protocol (e.g., the Display Data Channel (DDC) protocol discussed below, or other display device information sharing protocols known in the art). As such, one of skill in the art in possession of the present disclosure will recognize how the blocks of the method 400 discussed below may be performed with endpoint devices that have been identified as configured to provide display device information as described above (e.g., as including operating systems that support a display device information sharing protocol).

Figure 5A:
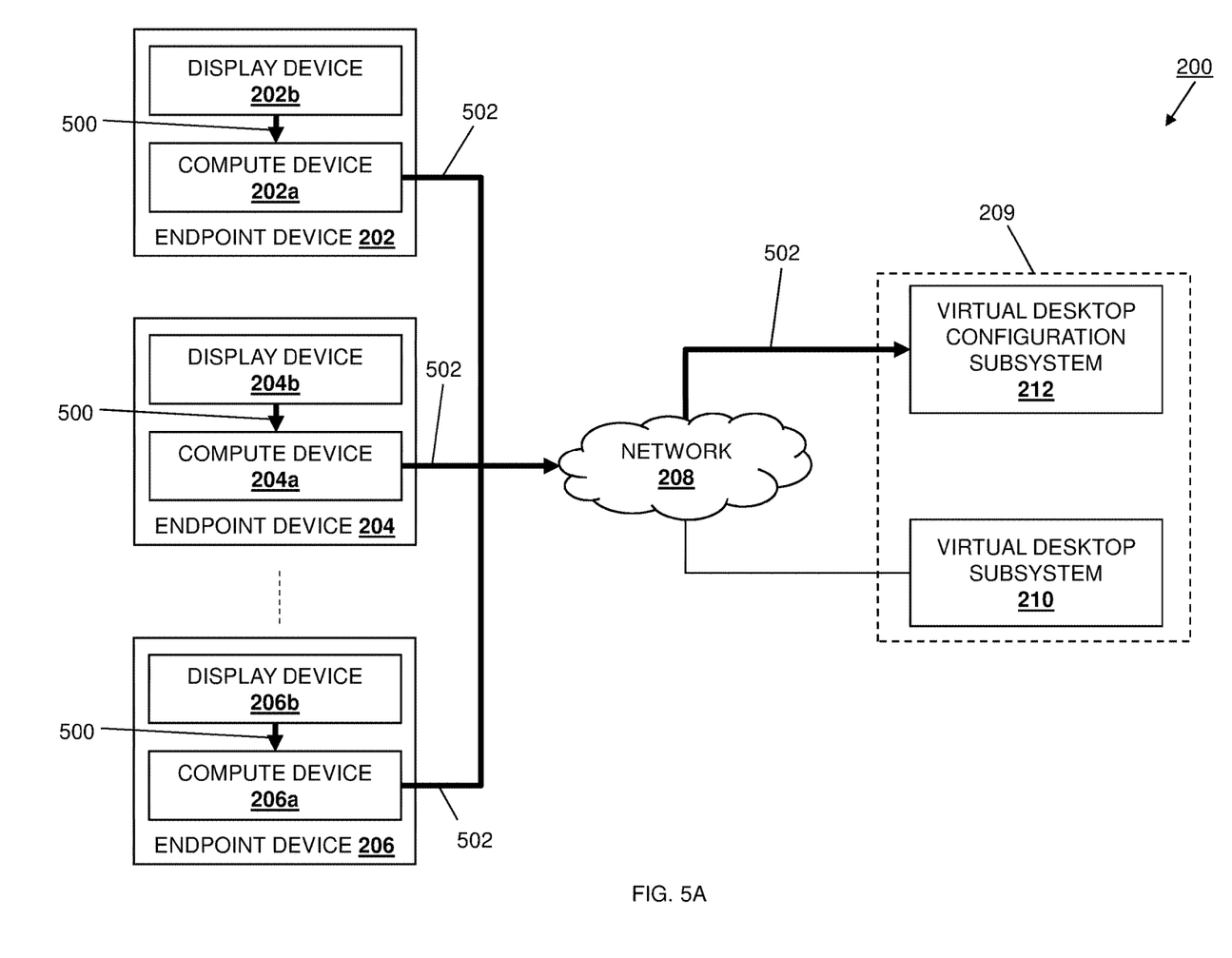
FIG. 5A is a schematic view illustrating an embodiment of the networked system of FIG. 2 operating during the method of FIG. 4.

With reference to FIG. 5A, in an embodiment of block 402, the compute devices 202a, 204a, and 206a in each of the endpoint devices 202, 204, and 206, respectively, may perform display device communication operations 500 with the display devices 202b, 204b, and 206c, respectively, in order to, for example, retrieve display device characteristics from that display device. As discussed above, the display device communication operations 500 may include DDC protocol communications that provide for the bidirectional sharing of information between the compute devices 202a, 204a, and 206a and the display devices 202b, 204b, and 206c, respectively, that may include display device characteristics such as a display device resolution (e.g., a maximum supported display device resolution for that display device such as a 4K resolution, a 1080p resolution, etc.), a display device brightness, a display device contrast, a display device color setting (e.g., display device color presets), a display device speaker (e.g., a built-in speaker on the display device) volume, and/or any other DDC information that would be apparent to one of skill in the art in possession of the present disclosure.

However, while a particular protocol (e.g., the DDC protocol) and particular display device characteristics are described as being retrieved from the display devices 202b, 204b, and 206c by the compute devices 202a, 204a, and 206a, respectively, one of skill in the art in possession of the present disclosure will appreciate how other protocols may be utilized to retrieve other display device characteristics at block 402 while remaining within the scope of the present disclosure as well. As illustrated in FIG. 5A, the compute devices 202a, 204a, and 206a in each of the endpoint devices 202, 204, and 206, respectively, may perform display device information transmission operations 502 to transmit the display device characteristics via the network 208 to the virtual desktop configuration subsystem 212 in the virtual desktop configuration system 209, and the virtual desktop configuration engine 304 in the virtual desktop configuration subsystem 212/300 may receive those display device characteristics and store them in its virtual desktop configuration database 306.

Furthermore, in some embodiments of block 402, the compute devices 202a, 204a, and 206a in each of the endpoint devices 202, 204, and 206, respectively, may perform display device characteristic identification operations to identify any user preferences associated with the display devices 202b, 204b, and 206c, respectively. For example, at block 402, users of the endpoint devices 202, 204, and 206 may be prompted by the virtual desktop configuration engine 304 in the virtual desktop configuration subsystem 212/300 in the virtual desktop configuration system 209 (e.g., via a dialog box displayed in a virtual desktop by the compute device via the display device in that endpoint device) to provide display device characteristics/user preferences that may include display brightness, display contrast, display color settings, and/or any other user preferences that would be apparent to one of skill in the art in possession of the present disclosure. In another example, the virtual desktop configuration engine 304 in the virtual desktop configuration subsystem 212/300 in the virtual desktop configuration system 209 may instruct the compute device to automatically retrieve any display device characteristics/user preferences stored by the compute device and/or display device in the endpoint devices 202, 204, and 206.

In either example, any display device characteristics/user preferences provided to or retrieved by a compute device in an endpoint device may be associated by the compute device with the user of that endpoint device via, for example, a user identifier that uniquely identifies that user. However, while a few specific examples of the retrieval of display device characteristics/user preferences have been described, one of skill in the art in possession of the present disclosure will appreciate how display device characteristics/user preferences for a display device may be retrieved in a variety of manners that will fall within the scope of the present disclosure as well. As such, the display device information transmission operations 502 performed by the compute devices 202a, 204a, and 206a in each of the endpoint devices 202, 204, and 206, respectively, may include transmitting the display device characteristics/user preferences via the network 208 to the virtual desktop configuration subsystem 212 in the virtual desktop configuration system 209, and the virtual desktop configuration engine 304 in the virtual desktop configuration subsystem 212/300 may receive those display device characteristics/user preferences and store them in its virtual desktop configuration database 306 (i.e., in association with the user identifier for those display device characteristics/user preferences via, for example, an Active Directory or similar system).

Further still, in some embodiments of block 402, the compute devices 202a, 204a, and 206a in each of the endpoint devices 202, 204, and 206, respectively, may perform display device characteristic identification operations to identify any organizational requirements associated with the display devices 202b, 204b, and 206c, respectively. For example, at block 402, an administrator of the endpoint devices 202, 204, and 206 may be prompted by the virtual desktop configuration subsystem 212 in the virtual desktop configuration system 209 to provide display device characteristics/organizational requirements that may include display brightness, display contrast, display color settings, built-in speaker volume, and/or any other organizational requirements that would be apparent to one of skill in the art in possession of the present disclosure. In another example, the virtual desktop configuration subsystem 212 in the virtual desktop configuration system 209 may prompt the compute device to automatically retrieve any display device characteristics/organizational requirements stored by the compute device and/or display device in the endpoint devices 202, 204, and 206.

In either example, any display device characteristics/organizational requirements provided to or retrieved by a compute device in an endpoint device may be associated by the compute device with the organization that controls that endpoint device via, for example, an organizational identifier that uniquely identifies the organization. However, while a few specific examples of the retrieval of display device characteristics/organizational requirements have been described, one of skill in the art in possession of the present disclosure will appreciate how display device characteristics/organizational requirements for a display device may be retrieved in a variety of manners that will fall within the scope of the present disclosure as well. As such, the display device information transmission operations 502 performed by the compute devices 202a, 204a, and 206a in each of the endpoint devices 202, 204, and 206, respectively, may include transmitting the display device characteristics/organizational requirements via the network 208 to the virtual desktop configuration subsystem 212 in the virtual desktop configuration system 209, and the virtual desktop configuration engine 304 in the virtual desktop configuration subsystem 212/300 may receive those display device characteristics/organizational requirements and store them in its virtual desktop configuration database 306 (e.g., in association with their organizational identifier for those display device characteristics/organizational requirements). In another example, an administrator of the endpoint devices 202, 204, and 206 may periodically provide organizational requirements via the network 208 to the virtual desktop configuration engine 304 in the virtual desktop configuration subsystem 212/300 in the virtual desktop configuration system 209.

The method 400 then proceeds to decision block 404 where the method 400 proceeds based on whether a request for a virtual desktop has been received from an endpoint device. In an embodiment, at decision block 404, any of the compute devices 202a, 204a, and 206a in each of the endpoint devices 202, 204, and 206, respectively, may request a virtual desktop from the virtual desktop configuration system 209 in response to, for example, the launching of a virtual desktop application (e.g., a VDI application) by a user of that endpoint device. In the examples below, each of the endpoint devices 202, 204, and 206 belong to an organization that utilizes the virtual desktop configuration system 209 to configure and provide virtual desktops for those endpoint devices, and thus one of skill in the art in possession of the present disclosure will appreciate how virtual desktops may be requested by endpoint devices and provided by the virtual desktop configuration system 209 at different times during the method 400 while remaining within the scope of the present disclosure.

If, at decision block 404, a request for a virtual desktop has not been received from an endpoint device, the method 400 returns to block 402. As such, the method 400 may loop such that the virtual desktop configuration engine 304 in the virtual desktop configuration subsystem 212 retrieves display device characteristics associated with the display devices 202b, 204b, and 206c in the endpoint devices 202, 204, and 206, respectively, (e.g., display device characteristics of the display devices, user preferences provided for those display devices, and/or organizational requirements for those display devices) as along as no request for a virtual desktop has been received. Thus, as endpoint devices are added to an organization, users set or update preferences for the display device in their endpoint device, and/or administrators set or update organizational requirements for an organization, those display device characteristics may be provided to the virtual desktop configuration system 209 for consideration when providing virtual desktops for the endpoint devices (discussed in further detail below).

Figure 5B:
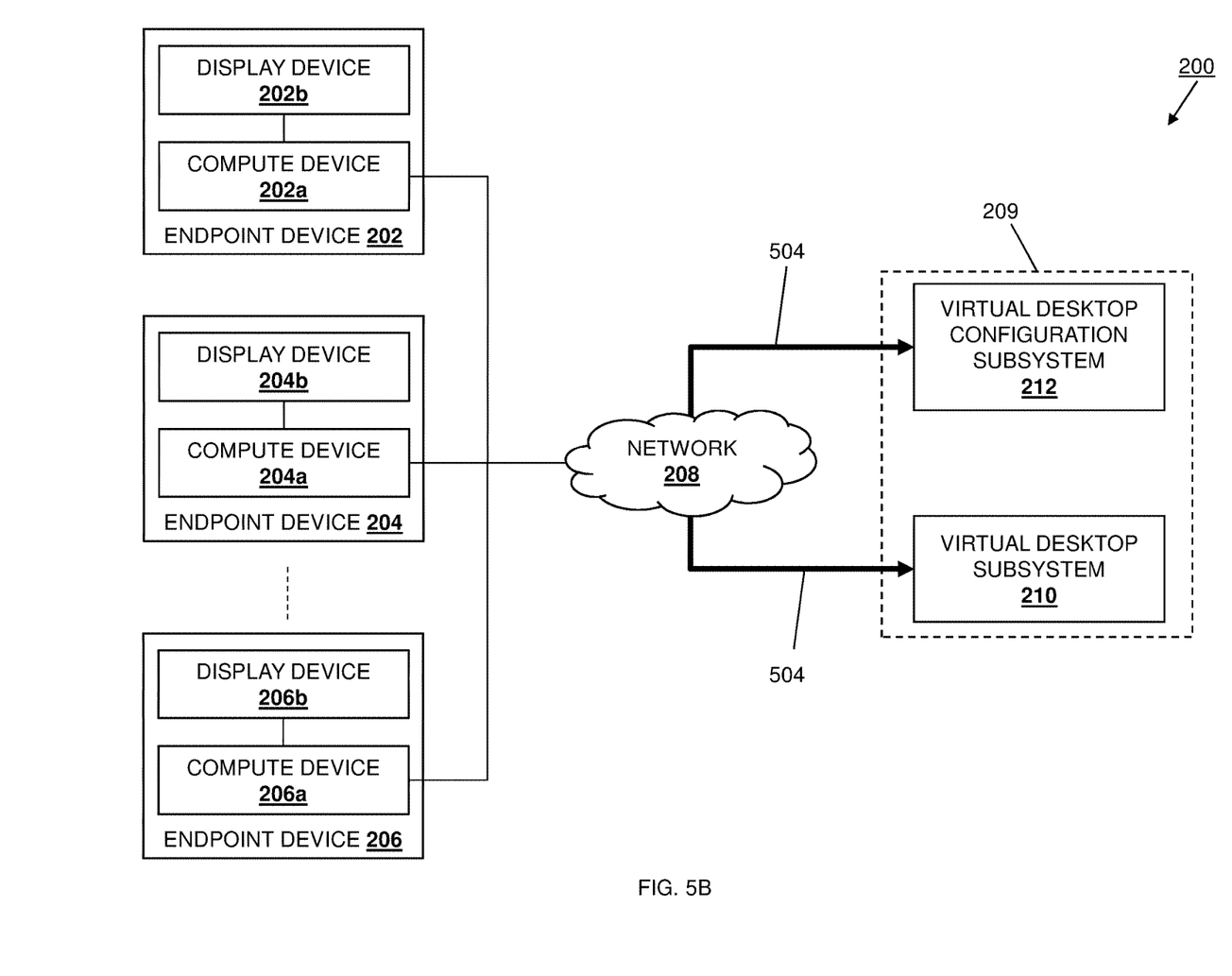
FIG. 5B is a schematic view illustrating an embodiment of the networked system of FIG. 2 operating during the method of FIG. 4.

If, at decision block 404, a request for a virtual desktop has been received from an endpoint device, the method 400 proceeds to block 406 where the virtual desktop configuration system configures virtual desktop display characteristics for a virtual desktop based on the display device characteristics. With reference to FIG. 5B, in an embodiment of block 406, the virtual desktop subsystem 210 and the virtual desktop configuration engine 304 in the virtual desktop configuration subsystem 212/300 may perform virtual desktop configuration operations 504 in order to configure a virtual desktop for the endpoint device(s). While the embodiment discussed herein illustrates the virtual desktop configuration operations 504 being performed via the network 208, as discussed above the virtual desktop subsystem 210 and the virtual desktop configuration subsystem 212 may be integrated into the virtual desktop configuration system 209 and thus may communicate directly rather than via the network 208 to configure a virtual desktop for the endpoint device(s). Furthermore, while the virtual desktop configuration is illustrated in FIG. 4 as occurring in response to receiving the request for the virtual desktop, in some embodiments the configuration of virtual desktops for display on the endpoint devices 202, 204, and 206 may be performed prior to the virtual desktop configuration system 208 receiving a request for a virtual desktop by one of those endpoint devices while remaining within the scope of the present disclosure as well.

For example, in some embodiments the configuration of the virtual desktop at block 406 may be performed by the virtual desktop configuration engine 304 in the virtual desktop configuration subsystem 212/300 prior to receiving a request for the virtual desktop from an endpoint device, and may be performed to configure master virtual desktop display characteristics for a master virtual desktop based on the display device characteristics retrieved at block 402. As will be appreciated by one of skill in the art in possession of the present disclosure, in embodiments in which multiple endpoint devices are included in an organization and provided virtual desktops (e.g., a "pooled" virtual desktop environment), such organizations may configure a master virtual desktop for provisioning to each of those endpoint devices. As such, in one embodiment of block 406, the virtual desktop configuration engine 304 in the virtual desktop configuration subsystem 212/300 may utilize display device characteristics stored in its virtual desktop configuration database 306 (e.g., the maximum supported resolution of each of the endpoint devices 202, 204, and 206 in the examples below) in order to configure the master virtual desktop characteristics (e.g., the master virtual desktop resolution in the examples below) for the master virtual desktop. Furthermore, as part of the virtual desktop configuration operations 504, the virtual desktop configuration engine 304 in the virtual desktop configuration subsystem 212/300 may provide the master virtual desktop characteristics for the master virtual desktop to the virtual desktop subsystem 210. A specific example of pseudocode is provided below to illustrate how a master virtual desktop characteristic such as resolution for a master virtual desktop may be configured:

```
IF   (OPERATING_SYSTEM==WINDOWS_VARIANT)
AND (DDC_AVAILABLE==TRUE)
{
IF DESKTOP-ENVIRONMENT==POOLED
   {
   for (l=0; l<number-of-desktops)
   {
   read_desktop_ddc_information( );
   if
     (current_desktop_display_resolution>stored_desktop_display_resolution)
   {
     stored_desktop_display_resolution=current_desktop_display_resolution
   }
   }
   pool_display_resolution=stored_desktop_display-resolution;
   }
}
ELSE
{
NO ACTION REQUIRED
}
```

To provide a specific example, the display device characteristics of a first subset of the endpoint devices 202, 204, and 206 may include maximum supported resolutions of 4K, while the display device characteristics of a second subset of the endpoint devices 202, 204, and 206 may include maximum supported resolutions of 1080p, and at block 406 the virtual desktop configuration engine 304 in the virtual desktop configuration subsystem 212/300 may configure the master virtual desktop resolution of the master virtual desktop at 4K, and that master virtual desktop may then be provisioned to endpoint devices from which requests are received at decision block 404 (discussed in further detail below). As will be appreciated by one of skill in the art in possession of the present disclosure, the configuration of the master virtual desktop resolution of the master virtual desktop at 4K will optimize the display of the master virtual desktop on the first subset of the endpoint devices 202, 204, and 206 that support resolutions of 4K, while the second subset of the endpoint devices 202, 204, and 206 will simply display the master virtual desktop at 1080p. However, while a specific configuration of a master virtual desktop with the highest resolution supported by a subset of the endpoint devices to which it will be provided has been described, one of skill in the art in possession of the present disclosure will appreciate how other master virtual desktop characteristics for a master virtual desktop may be configured while remaining within the scope of the present disclosure as well.

Furthermore, while the example above discusses the configuration of master virtual desktop characteristics of a master virtual desktop for a group of endpoint devices, other embodiments of the present disclosure may configure a virtual desktop for an endpoint device based on the display device characteristics associated with the display device in that endpoint device. For example, in response to receiving a request for a virtual desktop from an endpoint device at decision block 404, the virtual desktop configuration engine 304 in the virtual desktop configuration subsystem 212/300 may utilize display device characteristics stored in its virtual desktop configuration database 306 (e.g., the maximum supported resolution of that endpoint device) in order to configure the virtual desktop characteristics (e.g., the virtual desktop resolution) for the virtual desktop. Furthermore, as part of the virtual desktop configuration operations 504, the virtual desktop configuration engine 304 in the virtual desktop configuration subsystem 212/300 may provide the virtual desktop characteristics for the virtual desktop to the virtual desktop subsystem 210. However, rather than access the display device characteristics stored in its virtual desktop configuration database 306 in response to receiving the request for the virtual desktop as described above, the virtual desktop configuration engine 304 in the virtual desktop configuration subsystem 212/300 may retrieve the display device characteristics from the endpoint device that requested the virtual desktop in response to receiving that request, as part of that request, and/or in any other manner that would be apparent to one of skill in the art in possession of the present disclosure.

Figure 5C:
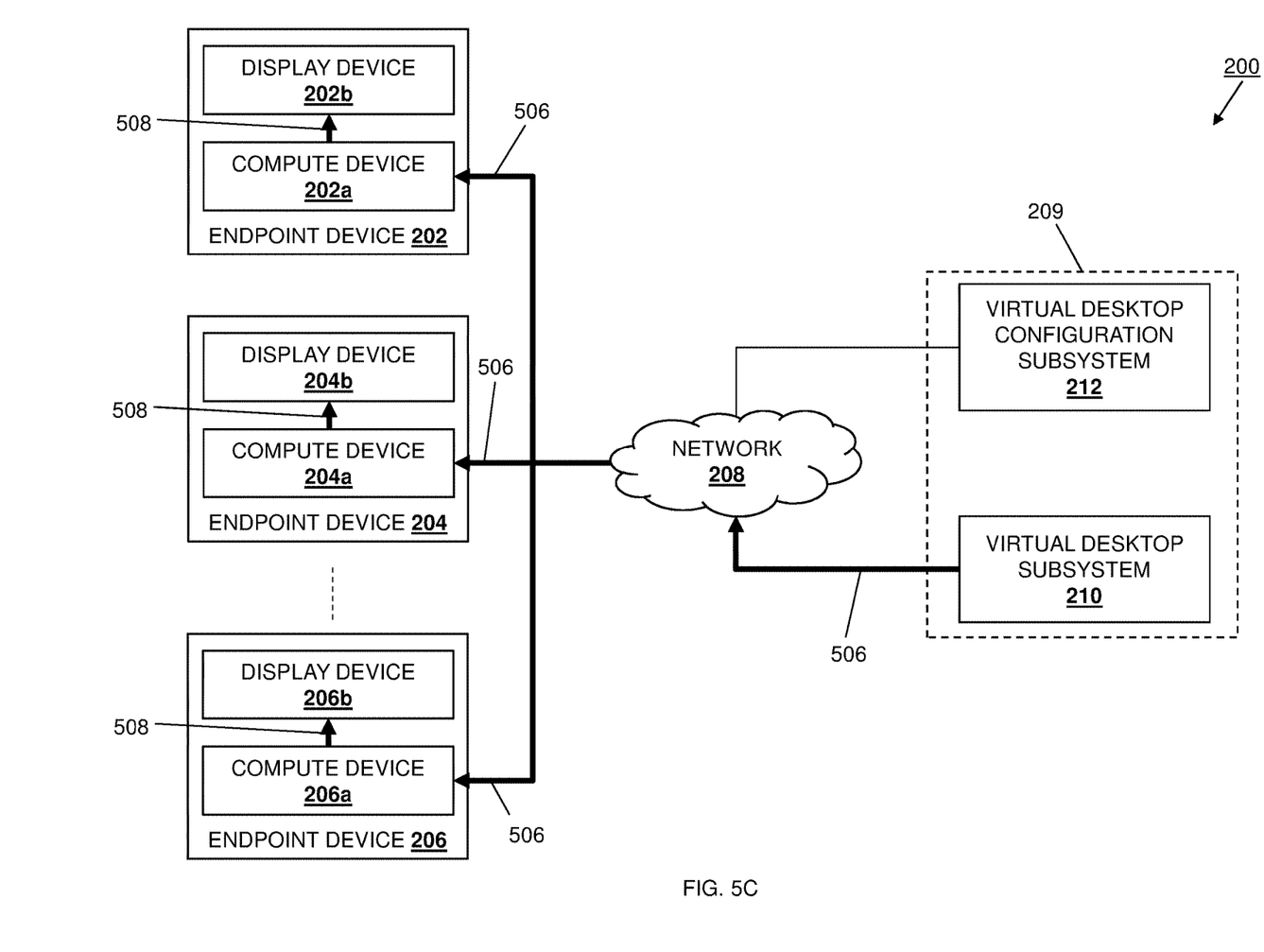
FIG. 5C is a schematic view illustrating an embodiment of the networked system of FIG. 2 operating during the method of FIG. 4.

The method 400 then proceeds to block 408 where the virtual desktop configuration system transmits virtual desktop images having the virtual desktop display characteristics to a compute device in the endpoint device to cause the compute device to display the virtual desktop images on a display device in the endpoint device. With reference to FIG. 5C, in an embodiment of block 408, the virtual desktop subsystem 210 in the virtual desktop configuration system 209 may perform virtual desktop provisioning operations 506 to provide a virtual desktop via the network 208 to any of the compute devices 202a, 204a, and/or 206a in the endpoint devices 202, 204, and/or 206, respectively, such that those compute devices 202a, 204a, and/or 206a, respectively, perform virtual desktop display operations 508 to display the virtual desktops on the display devices 202b, 204b, and/or 206b in the endpoint devices 202, 204, and/or 206, respectively. As such, continuing with the master virtual desktop example provided above and as part of the virtual desktop provisioning operations 506, the virtual desktop subsystem 210 may transmit master virtual desktop images having the master virtual desktop display characteristics to any compute device in an endpoint device that requested a virtual desktop in order to cause that compute device to display the master virtual desktop images on the display device in that endpoint device. Thus, in the specific example using the master virtual desktop configured with the master virtual desktop characteristics including a resolution of 4K, the virtual desktop subsystem 210 may transmit master virtual desktop pixels at a resolution of 4K to any compute device in an endpoint device that requested a virtual desktop in order to cause that compute device to display the master virtual desktop images on the display device in that endpoint device (e.g., displayed at a resolution of 4K in the event that display device supports a 4K resolution, at a resolution of 1080p in the event that display device supports a 1080p resolution, etc.).

Similarly, continuing with the single virtual desktop provided to the single endpoint device example provided above and as part of the virtual desktop provisioning operations 506, the virtual desktop subsystem 210 may transmit virtual desktop images having the virtual desktop display characteristics to the compute device in the endpoint device that requested a virtual desktop in order to cause that compute device to display the virtual desktop images on the display device in that endpoint device. Thus, in the specific example using the virtual desktop configured with the virtual desktop characteristics including a resolution of 4K, the virtual desktop subsystem 210 may transmit virtual desktop pixels at a resolution of 4K to the compute device in the endpoint device that requested a virtual desktop.

In some embodiments, if at decision block 406 it is determined that a request for a virtual desktop has been received from an endpoint device, the method 400 may proceed to optional block 410 where the virtual desktop configuration system identifies a user of the endpoint device and retrieves display device characteristics associated with the user. In some embodiments, block 406 of the method 400 may be performed in response to the virtual desktop configuration subsystem 212 in the virtual desktop configuration system 209 determining that the endpoint device that requested the virtual desktop is configured to receive display device information that includes user preferences and/or organizational requirements associated with a user or organization. Similarly as discussed above, in response to receiving the request for the virtual desktop, the virtual desktop configuration engine 304 in the virtual desktop configuration subsystem 212/300 may perform a remote system call via its communication system 300 and through the network 208 to detect whether the compute device in the endpoint device that requested the virtual desktop includes an operating system that supports a display device information configuration protocol (e.g., the DDC protocol discussed below, or other display device information configuration protocols known in the art). As such, one of skill in the art in possession of the present disclosure will recognize how the blocks of the method 400 discussed below may be performed with endpoint devices that have been identified as being configurable with display device information as described above (e.g., as including operating systems that support a display device information configuration protocol).

In an embodiment, at optional block 410, the virtual desktop configuration engine 304 in the virtual desktop configuration subsystem 212/300 may identify a user identifier for the user of the endpoint device that requested the virtual desktop at decision block 404 (e.g., via a user login to the virtual desktop system 209) and, in response, use that user identifier to retrieve user preferences associated with that user from the virtual desktop configuration database 306. Similarly, at optional block 410, the virtual desktop configuration engine 304 in the virtual desktop configuration subsystem 212/300 may identify an organizational identifier for the organization for the user of the endpoint device that requested the virtual desktop at decision block 404 (e.g., via a user login to the virtual desktop system 209 that identifies the organization) and, in response, use that organizational identifier to retrieve organizational requirements associated with that organization from the virtual desktop configuration database 306.

Figure 5D:
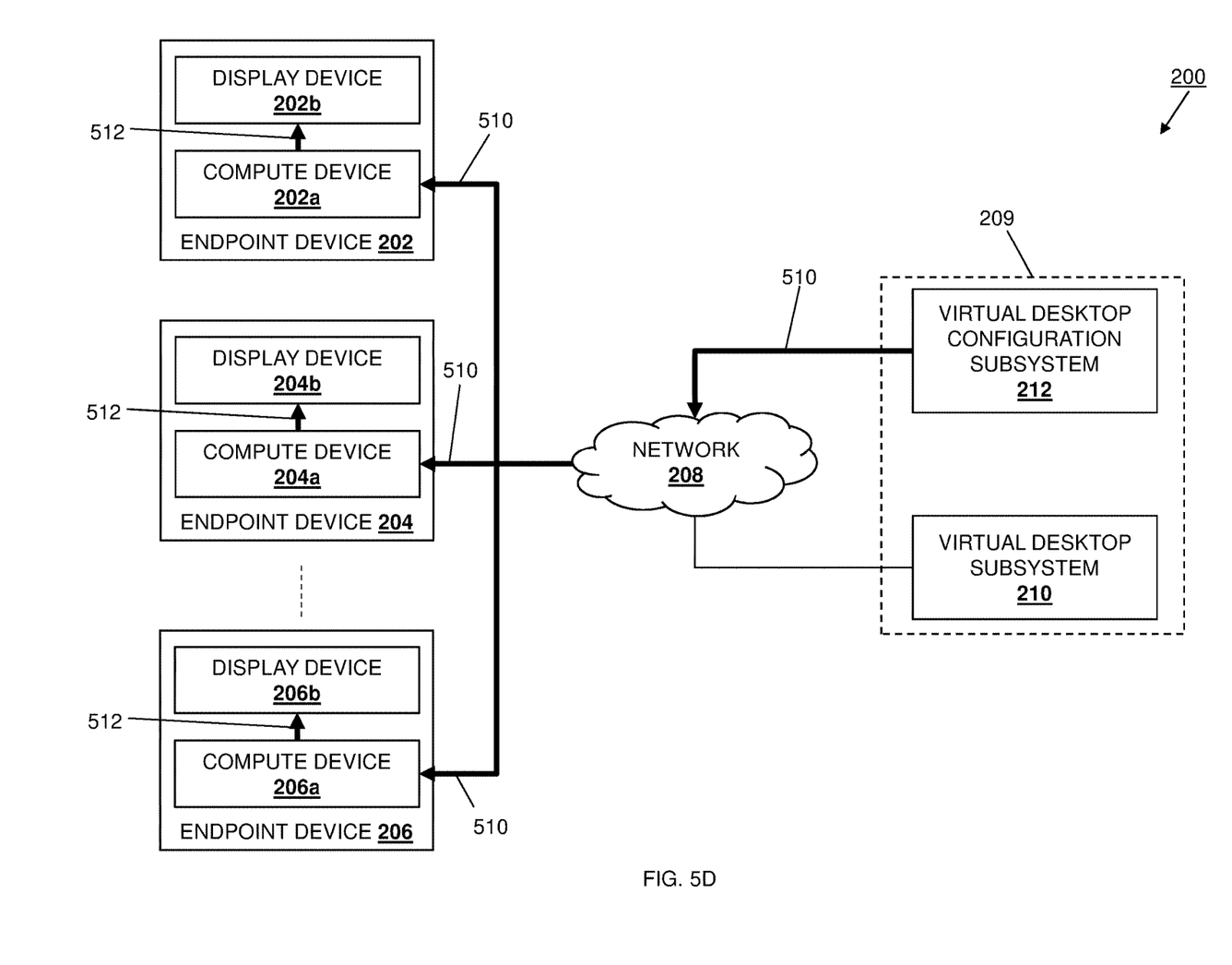
FIG. 5D is a schematic view illustrating an embodiment of the networked system of FIG. 2 operating during the method of FIG. 4.

The method 400 may then proceed to optional block 412 where the virtual desktop configuration system transmits the display device characteristics associated with the user to a compute device in the endpoint device to cause the compute device to configure the display device in the endpoint device based on the display device characteristics associated with the user. With reference to FIG. 5D, in an embodiment of optional block 412, the virtual desktop configuration engine 304 in the virtual desktop configuration subsystem 212/300 in the virtual desktop configuration system 209 may perform display device characteristic transmission operations 510 to transmit the user preferences and/or organizational requirements via the network 208 to any of the compute devices 202a, 204a, and/or 206a in the endpoint devices 202, 204, and/or 206, respectively, that requested the virtual desktop at decision block 404 such that those compute devices 202a, 204a, and/or 206a, respectively, perform display device configuration operations 512 to configure the display devices 202b, 204b, and/or 206b in the endpoint devices 202, 204, and/or 206, respectively, based on those user preferences and/or organizational requirements. As such, the display device characteristic transmission operations 510 and the display device configuration operations 512 may provide for the configuration of a display device in an endpoint device that requested a virtual desktop with a particular display device brightness preferred by a user or required by an organization, a display device contrast preferred by a user or required by an organization, a display device color setting (e.g., display device color presets) preferred by a user or required by an organization, a display device speaker volume preferred by a user or required by an organization, and/or any other user preference settings or organization requirements that would be apparent to one of skill in the art in possession of the present disclosure.

Thus, systems and methods have been described that provide for the sharing of DDC information with a VDI system to allow the VDI system to utilize display device capability information for display device(s) when configuring a virtual desktop for display on a display device, while also storing user preference information and/or organizational requirements as part of the VDI management environment in order to create a per-user display device policy enforcement system that allows user-specific preferences/organization-specific requirements to be applied on display devices/endpoint devices for any particular user and/or organization. As will be appreciated by one of skill in the art in possession of the present disclosure, the virtual desktop configuration system of the present disclosure ensures that the virtual desktop created for display on a display device will be optimized (e.g., that virtual desktop will be configured with the highest resolution supported by the that display device), and also may configure that display device with user preferences preferred by the user using that display device, and/or organizational requirements of an organization to which that user belongs. As such, as the user uses different endpoint devices in the organization, virtual desktops provided on the display devices in those endpoint devices will be optimized with the highest resolution available, and those display devices may have their brightness, contrast, color, and volume configured to the preferences of the user while not running afoul of any organizational requirements (which may set a maximum brightness or volume utilized with any particular display device).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:
a plurality of endpoint devices that each include a compute device and a display device; and
a virtual desktop configuration system that is coupled to the plurality of endpoint devices and that is configured to:
receive a request for a virtual desktop;
identify an organization associated with the request for the virtual desktop;
retrieve display device characteristics associated with each display device in the plurality of endpoint devices, and organizational display requirements that are associated with the organization and that include a maximum brightness and a maximum volume of any endpoint device providing the virtual desktop for display;
configure, based on the display device characteristics, virtual desktop display characteristics for a virtual desktop; and
transmit the organizational display requirements and the virtual desktop images having the virtual desktop display characteristics to each compute device included in the plurality of endpoint devices with a respective display device to cause that compute device to configure that respective display device according to the organizational display requirements, display the virtual desktop images on that respective display device without exceeding the maximum brightness included in the organizational display requirements, and provide audio without exceeding the maximum volume included in the organizational display requirements.

2. The system of claim 1, wherein the display device characteristics include a display device resolution.

3. The system of claim 1, wherein the virtual desktop configuration system is configured to:
retrieve display device characteristics associated with the display device in each of the plurality of endpoint devices;
configure, based on the display device characteristics, master virtual desktop display characteristics for a master virtual desktop; and
transmit the virtual desktop images having the master virtual desktop display characteristics to the compute device in each of the plurality of endpoint devices to cause the compute device in each of the plurality of endpoint devices to display the virtual desktop images on the display device in that endpoint device.

4. The system of claim 1, wherein the virtual desktop configuration system is configured to retrieve the display device characteristics associated with the display device in at least one of the plurality of endpoint devices via a Display Data Channel (DDC) protocol.

5. The system of claim 1, wherein the virtual desktop configuration system is configured to:
identify a user associated with the request for the virtual desktop;
retrieve at least one user display preference that is associated with the user and that defines how the user would like the virtual desktop to be displayed; and
transmit the at least one user display preference to a first compute device included in the plurality of endpoint devices with a first display device to cause the first compute device to configure the first display device according to the at least one user display preference.

6. The system of claim 5, wherein the configuring the first display device according to the at least one user display preference and the organizational display requirements includes configuring the first display device according to a first organizational display requirement in response to determining that a first user display preference runs afoul of the first organizational display requirement.

7. An Information Handling System (IHS), comprising:
a processing system; and
a memory system that is coupled to the processing system and that includes instructions that, when executed by the processing system, cause the processing system to provide a virtual desktop configuration engine that is configured to:
receive a request for a virtual desktop;
identify an organization associated with the request for the virtual desktop;

retrieve display device characteristics associated with each display device in a plurality of endpoint devices, and organizational display requirements that are associated with the organization and that include a maximum brightness and a maximum volume of any endpoint device providing the virtual desktop for display;

configure, based on the display device characteristics, virtual desktop display characteristics for a virtual desktop; and transmit the organizational display requirements and the virtual desktop images having the virtual desktop display characteristics to each compute device included in the plurality of endpoint devices with a respective display device to cause that compute device to configure that respective display device according to the organizational display requirements, display the virtual desktop images on that respective display device without exceeding the maximum brightness included in the organizational display requirements, and provide audio without exceeding the maximum volume included in the organizational display requirements.

8. The IHS of claim 7, wherein the display device characteristics include a display device resolution.

9. The IHS of claim 7, wherein the virtual desktop configuration engine is configured to:
retrieve display device characteristics associated with the display device in each of the plurality of endpoint devices;

configure, based on the display device characteristics, master virtual desktop display characteristics for a master virtual desktop; and transmit the virtual desktop images having the master virtual desktop display characteristics to the compute device in each of the plurality of endpoint devices to cause the compute device in each of the plurality of endpoint devices to display the virtual desktop images on the display device in that endpoint device.

10. The IHS of claim 7, wherein the virtual desktop configuration engine is configured to retrieve the display device characteristics associated with the display device in at least one of the plurality of endpoint devices via a Display Data Channel (DDC) protocol.

11. The IHS of claim 7, wherein the virtual desktop configuration engine is configured to:
identify a user associated with the request for the virtual desktop;

retrieve at least one user display preference that is associated with the user and that defines how the user would like the virtual desktop to be displayed; and transmit the at least one user display preference to a first compute device included in the plurality of endpoint devices with a first display device to cause the first compute device to configure the first display device according to the at least one user display preference.

12. The IHS of claim 11, wherein the configuring the first display device according to the at least one user display preference and the organizational display requirements includes configuring the first display device according to a first organizational display requirement in response to determining that a first user display preference runs afoul of the first organizational display requirement.

13. A method for configuring virtual desktops, comprising:
receiving, by a virtual desktop configuration system, a request for a virtual desktop;

identifying, by the virtual desktop configuration system, an organization associated with the request for the virtual desktop;

retrieving, by the virtual desktop configuration system, display device characteristics associated with each display device in a plurality of endpoint devices, and organizational display requirements that are associated with the organization and that include a maximum brightness and a maximum volume of any endpoint device providing the virtual desktop for display;

configuring, by the virtual desktop configuration system based on the display device characteristics, virtual desktop display characteristics for a virtual desktop; and transmitting, by the virtual desktop configuration system, the organizational display requirements and the virtual desktop images having the virtual desktop display characteristics to each compute device included in the plurality of endpoint devices with a respective display device to cause that compute device to configure that respective display device according to the organizational display requirements, display the virtual desktop images on that respective display device without exceeding the maximum brightness included in the organizational display requirements, and provide audio without exceeding the maximum volume included in the organizational display requirements.

14. The method of claim 13, wherein the display device characteristics include a display device resolution.

15. The method of claim 13, further comprising:
retrieving, by the virtual desktop configuration system, display device characteristics associated with the display device in each of the plurality of endpoint devices;

configuring, by the virtual desktop configuration system based on the display device characteristics, master virtual desktop display characteristics for a master virtual desktop; and transmitting, by the virtual desktop configuration system, the virtual desktop images having the master virtual desktop display characteristics to the compute device in each of the plurality of endpoint devices to cause the compute device in each of the plurality of endpoint devices to display the virtual desktop images on the display device in that endpoint device.

16. The method of claim 13, wherein the virtual desktop configuration engine is configured to retrieve the display device characteristics associated with the display device in at least one of the plurality of endpoint devices via a Display Data Channel (DDC) protocol.

17. The method of claim 13, further comprising:
identifying, by the virtual desktop configuration system, a user associated with the request for the virtual desktop;

retrieving, by the virtual desktop configuration system, at least one user display preference that is associated with the user and that defines how the user would like the virtual desktop to be displayed; and transmitting, by the virtual desktop configuration system, the at least one user display preference to a first compute device included in the plurality of endpoint devices with a first display device to cause the first compute device to configure the first display device according to the at least one user display preference.

18. The method of claim 17, wherein the configuring the display device in that endpoint device according to the at least one user display preference and the at least one organizational display requirement includes configuring the display device in that endpoint device according to a first organizational display requirement in response to determining that a first user display preference runs afoul of the first organizational display requirement.

\* \* \* \* \*